United States Patent [19]

Frank

[11] Patent Number: 5,068,564

[45] Date of Patent: Nov. 26, 1991

[54] END RETAINER RING ASSEMBLY FOR ROTARY ELECTRICAL DEVICES

[75] Inventor: Joseph J. Frank, Esperance, N.Y.

[73] Assignee: General Electric Company, Schenectady, N.Y.

[21] Appl. No.: 604,210

[22] Filed: Oct. 29, 1990

[51] Int. Cl.$^5$ .............................................. H02K 3/46
[52] U.S. Cl. ...................................... 310/270; 310/42; 277/9; 277/75
[58] Field of Search ................ 310/260, 261, 270, 271, 310/42, 195, 196, 197, 198; 277/9, 74, 75

[56] References Cited

U.S. PATENT DOCUMENTS

| | | | |
|---|---|---|---|
| 2,306,160 | 12/1942 | Freyssinet | 310/270 U X |
| 2,621,223 | 12/1952 | Vickers | 310/270 |
| 2,773,210 | 12/1956 | Vogt | 310/270 |
| 2,960,360 | 11/1960 | Taylor | 310/270 |
| 3,476,966 | 11/1969 | Willyoung | 310/270 |
| 4,413,649 | 11/1983 | Rodd et al. | 137/505.39 |
| 4,486,676 | 12/1984 | Moore et al. | 310/270 |
| 4,654,550 | 3/1987 | Lowther et al. | 310/42 |
| 4,912,354 | 3/1990 | Frank | 310/271 |

FOREIGN PATENT DOCUMENTS

| | | | |
|---|---|---|---|
| 0964160 | 5/1957 | Fed. Rep. of Germany | 310/270 |
| 1044490 | 11/1953 | France | 310/270 |

OTHER PUBLICATIONS

Fabrication & Evaluation of Scale Model Graphite/Epoxy Retaining Rings for Generator Applications; J. F. Meier; 07/27/88; Westinghouse Research & Dev. Center.

Primary Examiner—R. Skudy
Attorney, Agent, or Firm—Nixon & Vanderhye

[57] ABSTRACT

A rotary electrical device has a rotor body for receiving an inner retaining ring. A primary retaining ring is formed of a composite of epoxy and graphite fibers and has an integrally embedded auxiliary ring at one end thereof adjacent its open end. The auxiliary ring and inner retaining ring have complementary tapered surfaces with axially spaced, circumferentially extending seals therebetween. The inner retaining ring has fluid lines for receiving fluid under high pressure to facilitate axial assembly and a disassembly of the retaining ring relative to the rotor body. The retaining ring has a corrugated spring to accommodate differential expansion of the end windings of the electrical device and the composite retaining ring. A short-circuiting ring is at the inside diameter of the primary retaining ring. A corrugated spring is interposed between the primary retaining ring and the short-circuiting ring.

21 Claims, 2 Drawing Sheets

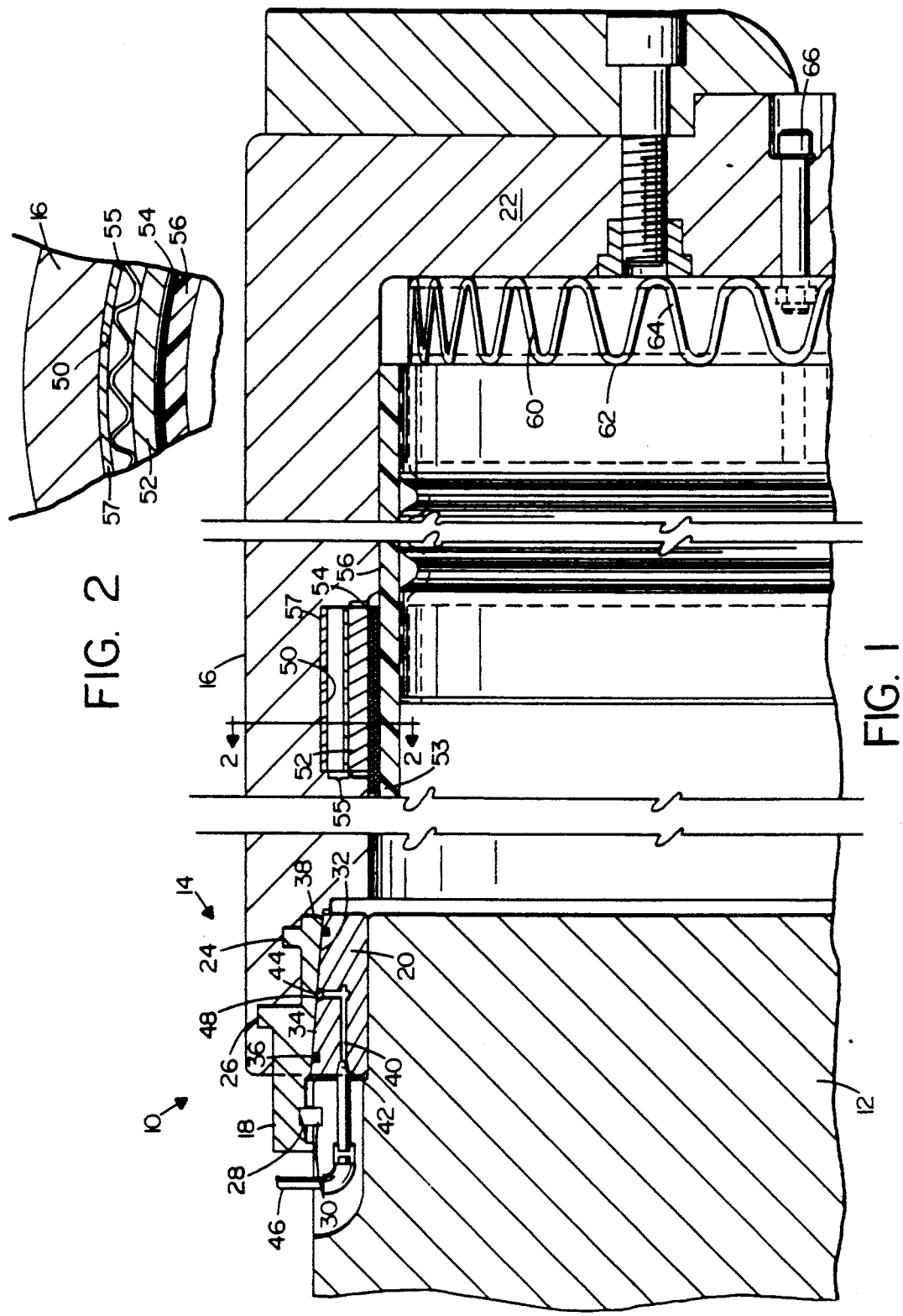

END RETAINER RING ASSEMBLY FOR ROTARY ELECTRICAL DEVICES

RELATED PATENT

This application relates to a rotor retaining ring system generally of the type described and illustrated in my U.S. Pat. No. 4,912,354, issued Mar. 27, 1990.

BACKGROUND AND SUMMARY OF THE INVENTION

The present invention relates to retaining rings and specifically to retaining rings formed of a composite, e.g., epoxy/graphite, material for supporting the field end windings of the rotors of rotating electrical devices such as generators, motors and condensers.

The field end windings of a generator, motor, condenser, or other rotating electrical devices are normally supported by a steel retaining ring fitted over the rotor end. The inner diameter of the retaining ring is less than the outer diameter of the rotor, typically in the range of 40 to 50 mils. To secure the retaining ring to the rotor end, the retaining ring is heated for a shrink fit onto the rotor end. Heat shrinking the retaining ring, however, can damage the insulation of the field end windings or the retaining ring itself or both. A centering ring is then fitted into a central bore of the retaining ring at the end away from the shrink fit. The retaining ring and the rotor cannot be keyed to one another because of the retaining ring's inability to withstand the stresses encountered during operation.

When a rotating electrical device is disassembled for maintenance or repair, the retaining ring must be heated in order to remove it from the rotor. Because of the required heavy shrink fit of the retaining ring to the rotor end, it is difficult and costly to supply the heat necessary for disassembly. The insulation on the windings can also be damaged during this process. With excessive heat, the retaining ring itself may be damaged. In the prior art, when a retaining ring is partially damaged because of stress corrosion, a cylindrical intermediate spacer ring has been inserted between the salvaged retaining ring and the rotor. But due to fit-up problems associated with the retaining ring, the cylindrical intermediate spacer ring, and the rotor, the retaining ring is typically completely replaced with a new retaining ring instead of being salvaged. Also, due to tolerance variations of the rotor end, retaining rings are usually customized. Further, because of the necessity of applying heat to retaining rings for both assembly and disassembly, repairs to rotating electrical devices at remote locations, such as ships at sea, for example, are especially difficult to perform.

In my above-mentioned prior patent, there is provided a system for assembling an end retaining ring on and disassembling it from the end of the rotor body without use of heat or heat shrinking techniques. In that system, there is provided an auxiliary ring disposed about the rotor body end and having an outer tapered surface. The retaining ring has at one end a complementary tapered surface such that the retaining ring end may be disposed about the tapered surface of the auxiliary ring. The auxiliary ring includes a fluid line having a fluid inlet port and a fluid outlet port opening into an annular groove about the outer tapered surface of the auxiliary ring whereby fluid may be disposed between the tapered surfaces. By supplying fluid under high pressure between the tapered surfaces through the fluid line, assembly and disassembly of the retaining ring onto the auxiliary ring is facilitated and accomplished without use of heat or heat shrinking techniques.

Both the present invention and my above-mentioned patent solve the problems associated with using heat shrinking techniques of the prior art by eliminating the need for such techniques. Moreover, both permit removal of the end retaining ring of the electrical device to more easily enable repairs, for example, remote pairs in naval generators, provide assembly and disassembly at substantially reduced costs and time and avoid damage to the surrounding insulation on the end windings of the rotor. While the retaining ring system of my prior patent is eminently useful and practical, there remains, however, the ever-present danger of stress corrosion cracking, the relatively high costs of manufacture and replacement of the retaining ring and other practical considerations of its use with very large diameter rotating electrical devices, such as generators. The present invention particularly enables the employment of even larger diameter generators because of the materials of the retaining ring hereof, eliminates stress corrosion problems, and affords other advantages as will become apparent.

According to the present invention, it has been found desirable and advantageous to replace the costly, non-magnetic alloy steel retaining ring with one formed of high strength, high stiffness, less expensive, less dense, and lighter weight composite material. Particularly, the field end windings support system hereof utilizes a primary retaining ring, an auxiliary ring, and an inner retaining ring. More specifically, the primary retaining ring of the present invention is formed of a composite, e.g., epoxy and graphite, preferably graphite fibers wound on a bias about a mandrel or form to form a generally cylindrical housing open at one end and closed at its opposite end. When forming the primary retaining ring hereof, the auxiliary ring is integrally formed with it and about its open end. Thus, the graphite fibers with impregnated epoxy are wound about the form or mandrel, preferably on a bias, to integrally incorporate therein the auxiliary ring adjacent the open end of the primary retaining ring. The auxiliary ring has an annular interior tapered surface which mates with a complementary tapered surface formed along the outer surface of the inner retaining ring. The inner retaining ring has an inner diameter providing for a line-line or a light press-fit on the rotor body end and overlies the radially outwardly opening grooves or slots at the end of the rotor body and through which ends the field end windings project. The inner retaining ring thus supports the windings in the slots, while the end windings projecting therefrom are supported by the primary composite retaining ring.

Composite retaining rings formed of epoxy and graphite are not per se new. For example, retaining rings formed of this composite material are discussed in a paper titled "Fabrication and Evaluation of Scale Model Graphite/Epoxy Retaining Rings for Generator Applications," by Dr. J. F. Meier. However, previous attempts at using composite materials for generator retaining rings were thwarted and complicated by the requirement to lock the ring to the generator rotor in order to prevent axial movement.

To assemble or disassemble the primary composite retaining ring on the rotor end in accordance with the present invention, a fluid line is provided in the auxiliary ring, the fluid line having a fluid inlet port for receiving high pressure fluid. The inlet port may be disposed to receive fluid externally of the rotor or from within the body of the end windings, i.e., from adjacent the axis of the rotor. The complementary tapered surfaces of the auxiliary ring and the inner retaining ring have axially spaced seals defining therebetween an annular groove in communication with a fluid outlet port of the fluid line in the inner retaining ring. Consequently, by applying high pressure fluid to the complementary tapered surfaces between the retaining rings, the integral composite assembly of the primary retaining ring and auxiliary ring may be readily and easily assembled and disassembled relative to the inner retaining ring.

With the windings in the slots being supported by the inner retaining ring, the end windings extending from the rotor are supported by the primary composite retainer ring. Axial support is provided by the radially inwardly directed flange at the closed end of the primary retaining ring opposite the auxiliary ring. Interposed between that flange and the end windings stack is a spring. This spring accommodates thermal expansion between the primary composite retaining ring and the end windings. The spring thus facilitates the axial differential expansion of the copper end windings and the composite retaining ring. More particularly, as the copper end windings become hot, and because the composite is a poor insulating material and remains cold, the copper end windings are displaced axially outwardly toward the end retaining ring. The spring disposed therebetween accommodates this movement without unbalancing the rotor. At rotor speed, however, the composite has a higher coefficient of expansion, thus the spring must accommodate the difference in axial expansion of the copper end windings and the composite flange of the primary retaining ring. Preferably, the spring is formed of a fiberglass material in the form of corrugations emanating from a central axis. That is, the ridges and grooves of the corrugations extend radially outwardly from the axis of the spring and lie circumferentially spaced one from the other about the spring. Thus, the spacing between the grooves and ridges becomes larger the further the grooves and ridges are located away from the axis of the spring. The spring is essential for, among other reasons, to prevent axial skewing of the axial end windings. This enables the end windings to remain balanced, thus inhibiting mechanical vibrations at rotor speed.

In accordance with the present invention, there is also provided a short-circuiting ring carried along the interior wall of the primary retaining ring. Particularly, the short-circuiting ring radially overlies the amortisseur windings. In this manner, there is provided a substantially continuous circumferential electrical path for the amortisseur windings to accommodate a fault. The composite ring is protected from differential radial expansion of the short-circuiting ring by a circumferentially extending corrugated metal spring ring overlying the outside diameter of the short-circuiting ring. The corrugations preferably extend axially. A thin metal shield overlies the corrugated metal spring between the composite ring and the corrugated metal spring ring.

In a preferred embodiment according to the present invention, there is provided a system for supporting the end windings of a rotatable electrical device having a rotor body rotatable about an axis and a rotor body end, comprising a primary retaining ring having an open end mountable to the rotor body end and extendable beyond the rotor body end to support the end windings, the primary retaining ring being formed of a composite of epoxy and graphite, an auxiliary ring carried by the primary retaining ring adjacent its open end and being integrally secured thereto, the auxiliary ring having a radially inwardly directed surface tapering radially inwardly from the open end of the primary retaining ring toward the opposite end thereof, and an inner retaining ring for overlying the rotor body end and having a radially outwardly directed surface tapering radially inwardly toward the axis in a direction toward the opposite end of the auxiliary ring. The tapered surface on the inner retaining ring is generally complementary to and for mating engagement with the tapered surface of the auxiliary ring.

In a further preferred embodiment according to the present invention, there is provided a system for supporting the end windings of a rotatable electrical device having a rotor body rotatable about an axis and a rotor body end, comprising a retaining ring assembly having an open end mountable to the rotor body and extendable beyond the rotor body end to support the end windings, the retaining ring assembly being substantially closed at its opposite end, means for securing the retaining ring assembly on the rotor body end and a spring carried by the retaining ring assembly adjacent an end thereof opposite the open end for accommodating axial expansion and contraction of the end windings relative to the retaining ring assembly.

In a still further preferred embodiment according to the present invention, there is provided a system for supporting the end windings of a rotatable electrical device having a rotor body rotatable about an axis and a rotor body end, comprising a primary retaining ring having an open end mountable to the rotor body end and extendable beyond the rotor body end to support the end windings, an auxiliary ring carried by the primary retaining ring adjacent its open end and being integrally secured thereto, the auxiliary ring having a radially inwardly directed surface tapering radially inwardly from the open end of the primary retaining ring toward the opposite end thereof, an inner retaining ring for overlying the rotor body end and having a radially outwardly directed surface tapering radially inwardly toward the axis in a direction toward the opposite end of the auxiliary ring, the tapered surface of the inner retaining ring being generally complementary to and for mating engagement with the tapered surface of the auxiliary ring and a spring carried by the primary retaining ring adjacent an end thereof opposite the open end for accommodating axial expansion and contraction of the end windings relative to the primary retaining ring.

Accordingly, it is a primary object of the present invention to provide a novel and improved end retainer ring assembly for a rotary electrical device such as a generator, wherein the retaining ring is formed of a high strength, high stiffness, inexpensive, less dense composite material which precludes sensitivity to stress corrosion cracking and eliminates completely any need for using heat shrinking techniques to assemble it on and disassemble it from rotary electrical devices.

These and further objects and advantages of the present invention will become more apparent upon reference to the following specification, appended claims and drawings.

BRIEF DESCRIPTION OF THE DRAWING FIGURES

FIG. 1 is a partial cross-sectional view taken along a plane passing through the axis of the rotor of a rotating electrical device and illustrating the rotor body end and a field end windings retaining assembly constructed in accordance with the present invention;

FIG. 2 is a fragmentary cross-sectional view thereof taken generally about on line 2—2 in FIG. 1.

DETAILED DESCRIPTION OF THE DRAWING FIGURES

Figure 3:
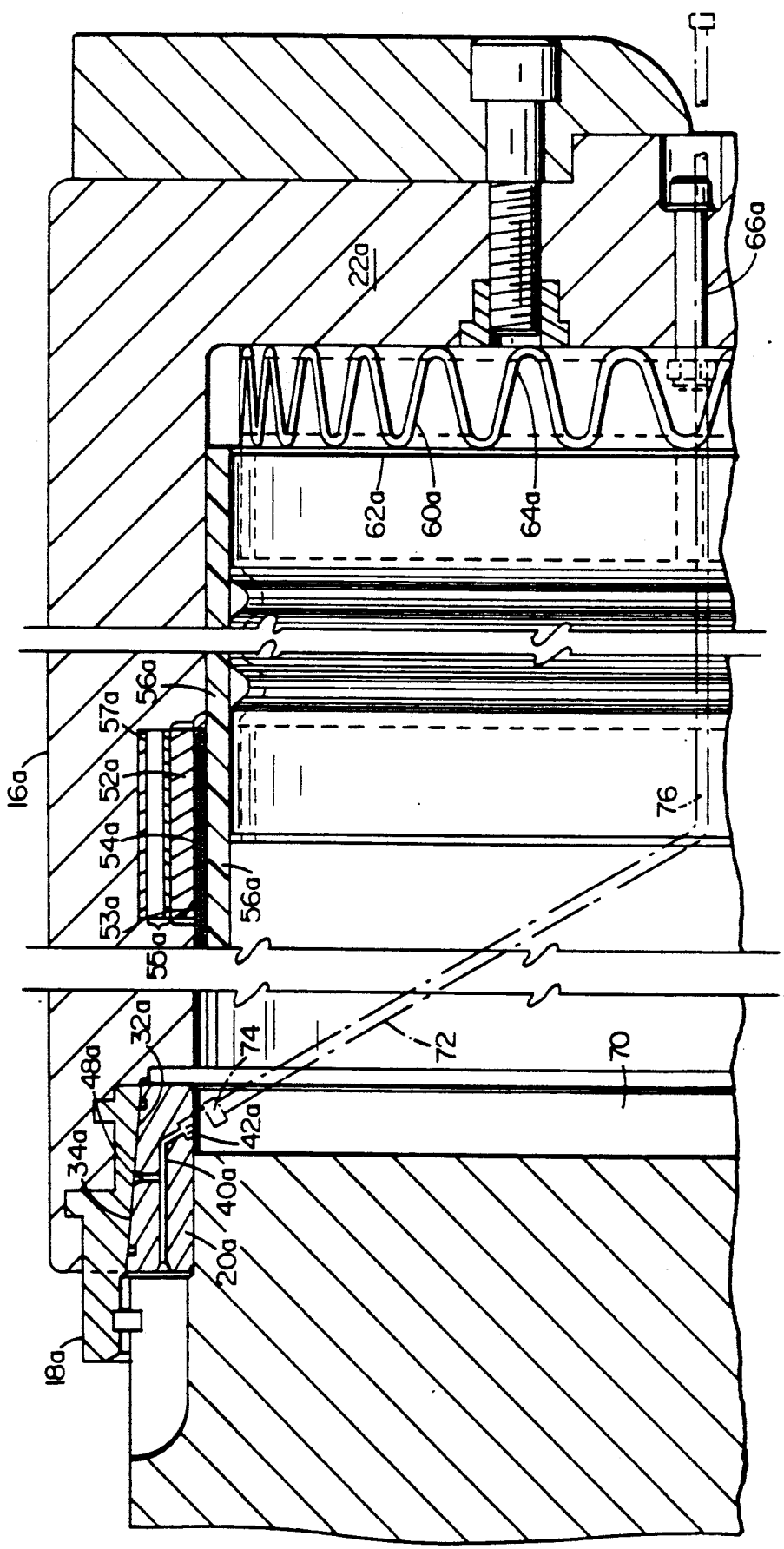
FIG. 3 is a view similar to FIG. 1 illustrating a different embodiment of a fluid inlet system for facilitating assembly and disassembly of the end retaining ring.

Reference will now be made in detail to a present preferred embodiment of the invention, an example of which is illustrated in the accompanying drawings.

Referring now to FIG. 1, there is illustrated a rotating electrical device, generally designated 10, having a rotor body 12 with conventional radially opening slots, not shown, for receiving the rotor windings, the slots being conventionally closed along the outer surface of the rotor body by a plurality of wedges, also not shown. At the end of rotor body 12, the windings project axially therefrom to form end windings (not shown in the drawings) which cross over into different slots. In FIG. 1, there is also illustrated an end retainer ring assembly, generally designated 14, comprised of a primary retaining ring 16, an auxiliary ring 18, and an inner retaining ring 20. The primary retaining ring 16 and auxiliary ring 18 are integrally formed one with the other with the auxiliary ring being located along the inside margin of the open end of retaining ring 16. The primary retaining ring is formed of a composite, e.g., epoxy and graphite, preferably graphite fibers wound on a mandrel or form to provide, with auxiliary ring 18, a generally cylindrical end retaining ring assembly having a radially inwardly directed flange 22 at the end thereof opposite auxiliary ring 18. Auxiliary ring 18 is preferably formed of steel and has a pair of axially spaced annular flanges 24 and 26 formed along its outer surface. A groove 28 for accommodating a locking ring 30 is provided along its inner surface adjacent the free end of auxiliary ring 18.

Auxiliary ring 18 is formed integrally with retaining ring 16 in the forming process. Particularly, the epoxy-impregnated graphite fibers are wound, preferably on a bias, about a mandrel or a form and about the auxiliary ring in a manner such that it becomes integrally attached to the ring 16. The flanges 24 and 26 provide for high axial strength with the multi-plies of the graphite fiber disposed about and between the flanges 24 and 26. The inner surface 32 of auxiliary ring 18 is tapered radially inwardly from the open end of retaining ring 16 toward the opposite end thereof having flange 22.

Inner retaining ring 20 comprises an annulus, preferably formed of steel, having an inner diameter substantially the same as the outer diameter of the end of rotor body 12. Inner retaining ring 20 has either a light press-fit or line-line onto the end surface of rotor body 12. The outer surface 34 of inner retaining ring 20 has a taper complementary to the taper of the inner surface 32 of auxiliary ring 18. Additionally, axially spaced, circumferentially extending grooves 36 and 38 are provided along the outer surface 34 of inner retaining ring 20 and accommodate seals, for example, O-ring type seals. Inner retaining ring 20 also has a fluid inlet line 40 having a fluid inlet 42 and a fluid outlet 44. Fluid inlet 42 is provided for removable connection with a high pressure fluid line 46. Additionally, outlet 44 communicates with an annular groove 48 formed about the outer surface 34 of inner retaining ring 20 whereby fluid under pressure may be supplied through inlet 42, fluid line 40, outlet 44 and about annular groove 48 between the seals in grooves 36 and 38 and along complementary tapered surfaces 32 and 34 to facilitate assembly and disassembly of the retaining ring 16 and auxiliary ring 18 combination with the inner retaining ring 20 in a manner to be described.

Intermediate the opposite ends of primary ring 16, there is provided a radially outwardly directed annular groove 50. Disposed in groove 50 is a short-circuiting ring 52 formed of electrically conductive material, such as aluminum. Short-circuiting ring 52 overlies amortisseur windings 54 which, in turn, overlie insulation 56 about the end windings. Thus, ring 52 constitutes a short-circuiting ring pressing upon the amortisseur windings for distributing electrical energy under fault conditions. The inside surface of the short-circuiting ring 52 is preferably chamfered at one end at 53 for ease of assembly and its opposite ends are axially spaced, as illustrated, from the ends of its confining slot formed in ring 16.

Overlying short-circuiting ring 52 is a metal spring 55, preferably corrugated in the axial direction. Corrugated spring 55 protects the composite ring 16 from the differential radial expansion of the short-circuiting ring 52. A thin metal, preferably aluminum, annular shield 57 overlies the corrugated metal spring 55 to facilitate assembly.

Adjacent the end flange 22 and within primary retaining ring 16, there is disposed a spring 60 for accommodating differential axial expansion of the end windings and end retaining ring. The spring 60 is preferably formed of non-electrically conductive fiberglass and is of corrugated construction, with the corrugations extending in a radial direction. That is, spring 60 is essentially an annulus having the ridges 62 and grooves 64 of the corrugations circumferentially spaced, and extending radially from the central portion of the spring outwardly to its outer circumference. Thus, ridges 62 and grooves 64 of the radially extending corrugations lie closer to one another toward the center of the spring, i.e., the central axis of the spring coincident with the axis of rotation of the rotor, than at radially outer positions relative thereto. The corrugated fiberglass spring is secured within the primary retaining ring 16 by bolts 66 which extend through the radial flange 22 into the bottom grooves 64 of corrugated spring 60. Consequently, as the end windings heat, they expand axially relative to primary retaining ring 16 and bias spring 60 which takes up their loading. The spring 60, however, remains in contact with the end windings to preclude asymmetrical forces, thus balancing the rotor and minimizing or eliminating the possibility of mechanical vibrations induced by such thermal expansion. Also, the spring accommodates the axial movement of the composite material of the primary retaining ring 16 relative to the end windings due to its different coefficient of expansion relative to the copper end windings.

To assemble the retainer ring assembly 14 on rotor body 12 in accordance with the present invention, a corrugated plastic spring 60 is first bolted to flange 22 with bolts 66 and then the inner retaining ring 20 is pressed axially onto the end of rotor body 12. The dimensions of inner retaining ring 20 and the end of the rotor body are such that only a light axial force on inner retaining ring 20 is necessary to locate it about the rotor body end. The high pressure fluid line 46 is then coupled to the inlet 42 of the inner retaining ring fluid line 40. Lubrication is then applied to the complementary tapered surfaces 32 and 34 of the auxiliary ring 18 and inner retaining ring 20, respectively. The primary retaining ring 16 and its integrally formed auxiliary ring 18 are then applied over the inner retaining ring 20 such that the tapered surfaces mate with one another. Pressure fluid is then supplied through the fluid feed lines, i.e., 46, inlet 42, line 40, outlet 44 and groove 48 such that the high pressure fluid is forced between the mating tapered surfaces and between the axially spaced, circumferentially extending seals. The pressure fluid is supplied with sufficient pressure to decrease the diametrical dimensions of the tapered outer wall surface 34 of inner retaining ring 20 and increase the diametrical dimensions of the tapered inner wall surface 32 of auxiliary ring 18. Contemporaneously therewith, axial pressure is provided on the end of the retaining ring assembly 14 to displace it axially inwardly toward rotor body 12, while simultaneously the pressure of the fluid is increased between the tapered surfaces. Axial force is applied to the retaining ring assembly 14 and the fluid pressure is increased until the split axial locking ring 30 is enabled to lock the auxiliary ring 18 and hence retaining ring 16 to the rotor body 12. This combination of axial pressure applied to retainer ring assembly 14 and fluid pressure supplied between the tapered surfaces 32 and 34 essentially cold press-fits the auxiliary ring 18 and the inner retaining ring 20 one to the other. After the fit is obtained, the high pressure fluid is deactivated and the line 46 is disconnected from inlet 42. It will be appreciated, of course, that the end retainer ring assembly 14 may be applied to the rotor end body using this same assembly and part but without the application of high pressure fluid. However, the technique of using high pressure fluid to facilitate the connection is preferred.

To disassemble the retaining ring 14 from the end of the rotor body, the locking ring 30 is first removed. The high pressure fluid inlet line 46 is connected to the inlet 42. Once connected, high pressure fluid is supplied between the tapering surfaces 32 and 34 to alter their diametrical dimensions, i.e., expand the diametrical dimension of the auxiliary ring 18 and decrease the outer diametrical dimension of the inner retaining ring 20. An axial force in a direction tending to disconnect the retainer ring assembly 14 from the rotor body 12 is applied to the retaining ring and the pressure of the pressurized fluid is simultaneously increased to facilitate separation of the mating complementary tapered surfaces. The high pressure fluid is then deactivated and the retaining ring can be fully removed from the inner retaining ring 20.

Referring now to FIG. 2, there is illustrated a similar end retainer ring assembly 14a, as illustrated in FIG. 1, with similar parts being designated by like reference numerals followed by the suffix letter "a". The primary retaining ring 16a and auxiliary ring 18a and other major components of the assembly are identical as previously described, with the exception of the inner retaining ring 20a. In this form, the fluid inlet port 42a for the fluid line 40a in the inner retaining ring 20a opens through a radially inner surface 70 of the inner retaining ring 20a. The inlet port 42a is provided with a removable sealing plug, not shown, which is maintained in the inlet port, except during assembly and disassembly of the retainer ring assembly 14a relative to the rotor body 12a. An external high pressure fluid feed line 72 having a screw-in plug 74 adapted to be connected to the inlet port 42a after removal of the plug from inlet port 42a, is illustrated in dashed lines. To make channel 40a by machining, it is necessary to permanently plug the unused end as illustrated in the drawing. Line 72 is connected via a line 76 to a high pressure fluid source, not shown. Thus, instead of connecting a high pressure fluid source from outside the rotor to the fluid inlet port 42, as illustrated in FIG. 1, the high pressure fluid source may be connected to the fluid inlet port 42a through a central portion of the end windings stack via high pressure fluid lines 72 and 76. The assembly and disassembly procedures previously described are similarly applicable to this embodiment of the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for supporting end windings of a rotatable electrical device having a rotor body rotatable about an axis and a rotor body end, comprising:
    a primary retaining ring having an open end mountable to the rotor body end and an opposite end, said primary retaining ring being extendable beyond the rotor body end to support the end windings, said primary retaining ring being formed of a composite material;
    an auxiliary ring carried by said primary retaining ring adjacent its open end and being integrally secured thereto, said auxiliary ring having a radially inwardly directed surface tapering radially inwardly in a direction from said open end of said primary retaining ring toward said opposite end thereof; and
    an inner retaining ring for overlying the rotor body end and having a radially outwardly directed surface tapering radially inwardly toward the axis in a direction toward said opposite end of said primary retaining ring, the tapered surface of said inner retaining ring being generally complementary to and for mating engagement with the tapered surface of said auxiliary ring.

2. Apparatus according to claim 1 wherein said inner retaining ring includes a high pressure fluid line having an inlet port for receiving high pressure fluid and an outlet port opening between said mating tapered surfaces, and axially spaced seals between said inner retaining ring and said auxiliary ring with said outlet port located therebetween whereby high pressure fluid is adapted to pass between said mating surfaces within said seals with sufficient pressure to facilitate either assembly or disassembly of the primary retaining ring and the auxiliary ring relative to said inner retaining ring.

3. Apparatus according to claim 1 wherein said primary retaining ring is formed of elongated graphite fibers impregnated with epoxy and wound about said auxiliary ring.

4. Apparatus according to claim 3 wherein said auxiliary ring has at least one annular radially outwardly projecting flange for facilitating securement of said primary retaining ring and said auxiliary ring one to the other with the graphite windings on opposite axial sides of said flange.

5. Apparatus according to claim 1 wherein the electrical device has amortisseur windings and said primary retaining ring carries a ring formed of electrically conductive material along an inner surface thereof at a location spaced axially from said auxiliary and inner retaining rings for short-circuiting the amortisseur windings.

6. Apparatus according to claim 5 wherein said primary retaining ring includes a radially outwardly directed groove formed along said inner surface thereof for receiving said short-circuiting ring.

7. Apparatus according to claim 5 including means interposed between said short-circuiting ring and said primary retaining ring from differential expansion of said short-circuiting ring.

8. Apparatus according to claim 5 including a metal spring corrugated in the direction of the axis of said rotor body and disposed between said primary retaining ring and said short-circuiting ring for protecting said primary retaining ring from differential expansion of said short-circuiting ring.

9. Apparatus according to claim 1 including a spring carried by said primary retaining ring adjacent an end thereof opposite said open end for accommodating axial expansion and contraction of the end windings relative to said primary retaining ring.

10. Apparatus according to claim 9 wherein said spring has corrugations and extends in a direction generally normal to the axis.

11. Apparatus according to claim 10 wherein said corrugations have ridges and grooves, said corrugations extending in a radial direction with the ridges and grooves of the corrugations lying closer to one another adjacent the axis than radially outwardly of the axis.

12. Apparatus according to claim 1 wherein said primary retaining ring has a radially inwardly directed end flange at the end thereof opposite its open end and integrally formed with said primary retaining ring of said epoxy and graphite.

13. Apparatus according to claim 11 wherein said primary retaining ring has a radially inwardly directed end flange at the end thereof opposite its open end and integrally formed with said primary retaining ring of said epoxy and graphite, and means for connecting said corrugated spring and said end flange one to the other whereby said spring accommodates differential expansion of the end windings and the primary retaining ring flange.

14. A system for supporting end windings of a rotatable electrical device having a rotor body rotatable about an axis and a rotor body end, comprising:
a retaining ring assembly having an open end mountable to the rotor body and an opposite end, said retaining ring assembly being extendable beyond the rotor body end to support the end windings, said retaining ring assembly being substantially closed at its opposite end;
means for securing said retaining ring assembly on the rotor body end; and
a spring carried by said retaining ring assembly adjacent an end thereof opposite said open end for accommodating axial expansion and contraction of the end windings relative to said retaining ring assembly, said spring having corrugations and extending in a direction generally normal to the axis of the rotor body, said corrugations having ridges and grooves, said corrugations extending in a radial direction with the ridges and grooves of the corrugation lying closer to one another adjacent the axis of the rotor body than radially outwardly of said axis.

15. Apparatus according to claim 14 wherein said corrugated spring is formed of a non-electrically conductive material.

16. Apparatus according to claim 14 wherein said retaining ring assembly includes a primary ring having a radially inwardly directed end flange at the end thereof opposite its open end, said ring being formed of epoxy and graphite, and means for connecting said corrugated spring and said end flange one to the other whereby said spring accommodates differential expansion of the end windings and the retaining ring assembly.

17. Apparatus according to claim 16 wherein said retainer ring assembly includes an auxiliary ring integrally connected with said primary ring about the open end thereof, said primary ring being formed of elongated graphite fibers impregnated with epoxy and wound about said auxiliary ring.

18. Apparatus according to claim 16 wherein the electrical device has amortisseur windings and said primary ring carries a short-circuiting ring formed of electrically conductive material along an inner surface thereof at a location spaced axially from the opposite end of the primary ring for short-circuiting the amortisseur windings.

19. Apparatus according to claim 18 including means interposed between said short-circuiting ring and said primary ring for protecting said primary ring from differential expansion of said short-circuiting ring.

20. A system for supporting end windings of a rotatable electrical device having a rotor body rotatable about an axis and a rotor body end, comprising:
a primary retaining ring having an open end mountable to the rotor body end and an opposite end, said primary retaining ring being extendable beyond the rotor body end to support the end windings;
an auxiliary ring carried by said primary retaining ring adjacent its open end and being integrally secured thereto, said auxiliary ring having a radially inwardly directed surface tapering radially inwardly from said open end of said primary retaining ring toward the opposite end thereof;
an inner retaining ring for overlying the rotor body end and having a radially outwardly directed surface tapering radially inwardly toward the axis in a direction toward said opposite end of said primary retaining ring, the tapered surface of said inner retaining ring being generally complementary to and for mating engagement with the tapered surface of said auxiliary ring; and
a spring carried by said primary retaining ring adjacent an end thereof opposite said open end for accommodating axial expansion and contraction of the end windings relative to said primary retaining ring.

21. Apparatus according to claim 20 wherein said spring has corrugations with ridges and grooves and extends in a direction generally normal to the axis of the rotor body, said corrugations extending in a radial direction with the ridges and grooves of the corrugations lying closer to one another adjacent the axis of the rotor body than radially outwardly of said axis.

* * * * *